3,177,170
GLASS EMULSION COATING COMPOSITION OF A FILM FORMING RESIN AND AN HYDROXY SILANE
Albert H. Lund, McKees Rocks, Pa., assignor, by mesne assignments, to Mobil Finishes Company, Inc., New York, N.Y., a corporation of Delaware
No Drawing. Filed Apr. 4, 1961, Ser. No. 100,511
15 Claims. (Cl. 260—29.2)

The present invention relates to coating compositions particularly adapted to form adherent coatings upon glass, including untreated glass.

The reluctance of glass to adherently accept organic resinous coatings in a manner resistant to exposure to moisture, solvents such as methyl and ethyl alcohol, and household cleaning conditions is well known and various pretreatment agents have been proposed, these being applied to the glass surface and dried prior to application of the organic resinous coating. Thus, prior practice has involved the application of two separate coatings, e.g., a first coating of a pretreatment agent which is dried to associate the agent with the glass surface, and a second coating to apply the organic resinous coating. The invention is principally directed to relatively stable coating compositions which can be applied to untreated glass in a single coating operation to provide, after curing, a coating which is firmly adhered to the glass.

Because of the desirability of single coat application, it has been suggested to combine the pretreating agent and the organic resinous film-forming material into a single coating for application in a single step. This has not previously been successful. When both the pretreating agent and the resin are combined in a common solution medium, they undesirably interact. When emulsions are used, this undesirable interaction persists, except when the emulsions are of the type contemplated by the invention.

In accordance with the invention, a reactive film-forming resin in solution in a water-immiscible organic solvent is dispersed in a continuous aqueous phase containing dissolved alkoxy silane or the hydrolyzate thereof (the corresponding hydroxy silane) or the corresponding halide which generates the hydroxy silane in situ, the silane being substituted to provide at least one functional group which is reactive with a functional group contained in the film-forming resin.

It is essential in accordance with the invention that the silane be in a continuous aqueous phase, that the silane and the film-forming resin be reactive with one another and that the resin be present in a discontinuous liquid phase which is incompatible with the continuous aqueous phase. When these essential features are observed, reaction between the resin and the silane is delayed until the continuous aqueous phase has wet the glass surface to be coated and the water has been evaporated to permit the water-immiscible resin-containing solvent particles to coalesce and form a film.

The hydroxy silanes or precursors thereof used in the invention are water-soluble compounds of silicon including a reactive functional group. Preferably, the functional group is carried by a carbon chain substituent. The water-soluble silanes have the following structural formula:

$$X_m—Si—(Y)_n$$

in which X is a substituent including a reactive functional group, Y is selected from the group consisting of hydroxy and precursors thereof such as alkoxy and halogen radicals and $m$ and $n$ are integers totaling 4. Preferably, $m$ is 1 and $n$ is 3 and Y is most preferably an ethoxy radical to provide triethoxy silanes.

The proportion of water-soluble silane compound is of secondary significance. Proportions of as little as 0.05% based on the total weight of the emulsion formulation have been found to be adequate. Proportions above about 5.0% are not economical, but may be used if desired.

The specific nature of the functional group forming part of the water-soluble silane compound is of secondary significance in the invention, so long as it is reactive with the functional groups which form part of the film-forming resin. Thus, the silane may include basic functionality, such as amine functionality, in which event it would be reactive with, for example, carboxyl or oxirane functionality in the film-forming resin. Similarly, the silane may include acidic functionality provided by, for example, carboxyl groups or ester groups which generate carboxyl functionality in situ. In such event, the silane would be reactive with the hydroxyl or methylol groups forming part of the film-forming resin. Still other types of reactive functional groups can be used. For example, the presence of unsaturated double bonds in the silicon substituent can be used as the basis for an addition polymerization with, for example, vinyl or other olefinic unsaturation in the film-forming resin.

The presence of amine functionality in the water-soluble silane compound is illustrated by the following compounds:

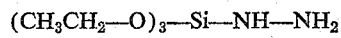

Water-soluble silanes useful in the invention and providing carboxyl reactivity are illustrated by the following compounds:

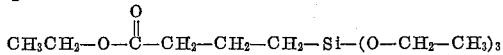

The presence of unsaturation in the silane compound is illustrated by vinyl silanes such as vinyl triethoxy silane, alpha-chloro vinyl triethoxy silane, beta-chloro vinyl triethoxy silane and bicycloheptenyl triethoxy silane. These and other similar water-soluble unsaturated silanes useful in the invention are well known and discussed, for example, in United States Patents Nos. 2,720,470; 2,763,629 and 2,965,515.

Instead of using alkoxides or hydroxides, one may use halides which will generate hydroxy groups in situ. Thus, aroxy alkylhalosilanes illustrated by the reaction product of allyltrichlorosilane with phenol, a cresol or a xylenol may be used and these are reactive with polyester resins, epoxy resins and phenolic resins.

It is essential in accordance with the invention that the film-forming resin be dissolved in an organic solvent which is essentially immiscible with water. In the absence of a water-immiscible organic solvent, the film-forming resin with its reactive functional groups will come into association with the aqueous phase and react prematurely with the hydroxy silane, such premature reaction being detrimental in accordance with the invention.

Accordingly, the selection of the organic solvent which is used is dictated by the requirement that the solvent be immiscible with water and that it be capable of dissolving the film-forming resin which is used in the combination. Aromatic hydrocarbon solvents are particularly effective, the preferred solvents being mononuclear aromatic hydrocarbon solvents of the benzene series such as benzene, toluene, any of the various xylenes and diverse liquid alkyl-substituted benzenes, either alone or in admixture with one another. To improve the solvating efficacy of the organic solvent system, aliphatic solvents which are essentially immiscible with water may be included such as isophorone and diisobutyl ketone.

A particularly suitable water-immiscible solvent system for use in the invention is a 70/15/15 weight ratio mixture of Solvesso 150/isophorone/diisobutyl ketone. Solvesso 150 is a commercial mixed aromatic hydrocarbon solvent including a minor amount of aliphatic solvent having the following characteristics.

| | |
|---|---|
| Specific gravity at 60/60° F. | 0.8919 |
| Flash, ° F. (Tag closed cup), min. | 150 |
| Distillation ASTM (D268): | |
| Initial boiling point, ° F. | 375 |
| 10% | 380 |
| 50% | 387 |
| 90% | 392 |
| Dry point, ° F. | 398 |
| Final boiling point, ° F. | 410 |
| K-B value (toluol=100) | 83 |
| K-B value (after 75% is evaporated) | 114 |
| Mixed aniline point, ° C. | 20.1 |
| Percent aromatics | 95 |

So long as the organic solvent solution of film-forming resin is dispersed in water to form an oil in water emulsion, the particular technique employed to stabilize the emulsion against breaking is of secondary significance. A particularly preferred emulsification system in accordance with the invention is the use of a long chain fatty acid such as oleic acid or stearic acid dissolved in the organic solvent solution, the acid-containing solvent solution being then dispersed with agitation in water containing a volatile nitrogenous base such as ammonia or a volatile amine, such as ethyl amine or morpholine.

A particularly desirable emulsification system is ammonia and oleic acid use in an amount of about 1 part of the combination per 60 parts of organic solution being emusified. The ammonium oleate formed during emulsification decomposes during baking to release a residue of oleic acid which is water insoluble and which is easily tolerated in the cured coating when its proportion is not excessive.

On occasion, it is desirable from the standpoint of providing a single package system of enhanced shelf life, to temporarily tie-up the functionality in the hydroxy silane which is selected. Thus, when the silane includes amine functionality, a small amount of a volatile organic acid may be added to further reduce the opportunity for the silane to prematurely react with the functional groups contained in the film-forming resin. Of course, when the system is baked, the volatile organic acid is eliminated to restore full amine functionality for coreaction with the functional groups contained in the film-forming resin.

While the proportion of water which is used in the emulsions of the invention is of secondary significance, it is desirable to minimize the amount of water which is used to thereby provide coating compositions of higher viscosity and increased resin solids content.

The emulsions of the invention are quite stable and resistant to mechanical working such as pumping or propeller agitation. Even in the absence of anti-freeze agents, frozen emulsions can be re-emulsified after thawing to permit application without loss in film properties.

The production of the emulsions of the invention is rather simple, a preferred procedure which is used in the examples of this application being as follows:

The various film-forming resins which are used are dissolved in the water-immiscible solvents which have been selected to provide a solvent solution. The specific procedure for dissolving the resins normally involves the use of heat and agitation and precautions normally observed in the preparation of any organic solvent solution coating composition would be observed in effecting the required dissolution of the resins. To this soltuion at 80° F., a small amount of oleic acid is added and the acid-containing solution is then vigorously agitated, preferably under cooling conditions and a premixed solution of ammonium hydroxide in water is added. The agitation is continued until the emulsion is smooth and uniform. The selected hydroxy silane or its precursor is then dissolved in a small proportion of water and this water solution is then added to the emulsion with agitation. When a pigmented composition is formed, the pigment is ground into the organic solvent solution before the addition of water. Alternatively, the colorant may be in the continuous water phase. Thus, water soluble dyes or water dispersible pigments can be added to the water phase with equal success.

The invention is illustrated in the examples which follow in which all parts are by weight:

Example 1

Using the procedure described hereinbefore, an acrylic/epoxy thermosetting vehicle including an amino silane is formed to contain the following components.

| Composition: | Parts |
|---|---|
| Copolymer of butyl methacrylate and acrylic acid in weight ratio of 92/5 produced by copolymerizing in methyl ethyl ketone at 80° C. in the presence of 1% benzoyl peroxide | 12.1 |
| Diglycidyl ether af 2,2'-bis-(p-hydroxyphenylpropane) (average molecular weight 390, epoxy value equivalency per 100 grams, 0.54) | 1.0 |
| Basic curing catalyst (diisobutyl phenoxy ethoxy ethyl dimethyl benzylammonium chloride, monohydrate) | 0.1 |
| Xylene | 42.1 |
| n-Butyl alcohol | 10.6 |
| Oleic acid | 0.4 |
| Demineralized water | 33.1 |
| Ammonia (28%) | 0.4 |
| Amino functional silane ($H_2N-CH_2-CH_2-CH_2-Si-(O-CH_2-CH_3)_3$) | 0.1 |
| Acetic acid (glacial) | 0.1 |
| | 100.0 |

Emulsions made with the foregoing components are useful for application to glass, conveniently by spraying, and adherent films are formed on the glass surface when the coating is cured by baking. Desirably, the glass is preheated.

The present example illustrates a clear vehicle but it will be understood that various agents may be added such as ultra-violet absorbers or dyes or pigments and these may be added to either the solution or oil phase or to the aqueous phase.

Example 2

The application of the same amino silane used in Example 1 to a vinyl/epoxy/urea-formaldehyde thermosetting vehicle is illustrated in the present example.

| Composition | Parts | | |
|---|---|---|---|
| | A | B | C |
| Titanium dioxide rutile | | | 16.3 |
| Copolymer 87% vinyl chloride and 13% vinyl acetate hydrolyzed to contain 6% of vinyl alcohol | 8.6 | 8.1 | 8.1 |
| Copolymer of 86% vinyl chloride, 13% vinyl acetate and 1% maleic acid | | 0.5 | 0.5 |
| Heat-hardenable, solvent-soluble, butylated urea-formaldehyde condensate | 1.1 | 1.1 | 1.1 |
| Diglycidyl ether of 2,2'-bis-(p-hydroxyphenylpropane) Average molecular weight 630, epoxy value equivalency per 100 grams 0.131 | 1.1 | 1.1 | 1.1 |
| Isophorone | 21.7 | 21.7 | 21.7 |
| Solvesso 100 | 32.5 | 32.5 | 32.5 |
| Oleic acid | 1.1 | 1.1 | 1.1 |
| Demineralized water | 32.5 | 32.5 | 16.2 |
| Ammonia (28%) | 1.1 | 1.1 | 1.1 |
| Amino functional silane of Example 1 | 0.2 | 0.2 | 0.2 |
| Acetic acid (glacial) | 0.1 | 0.1 | 0.1 |
| | 100.0 | 100.0 | 100.0 |

The Solvesso 100 used in the present example is a commercial mixed aromatic hydrocarbon solvent having the following characteristics.

| | |
|---|---|
| Specific gravity at 60/60° F. | 0.8749 |
| Flash, ° F. (Tag closed cup), min. | 100 |
| Distillation ASTM (D268): | |
| Initial boiling point, ° F. | 306 |
| 10% | 311 |
| 50% | 317 |
| 90% | 327 |
| Dry point, ° F. | 343 |
| Viscosity, cp., at 25° C. | 0.797 |
| K-B value (toluol=100) | 90 |
| K-B value (after 75% is evaporated) | 98 |
| Mixed aniline point, ° C. | 12.0 |
| Percent aromatics | 99.5 |

With respect to Compositions A and B, the emulsions are stable and form adherent films which are resistant to water when the emulsion is sprayed on glass and baked. With respect to Composition C, this emulsion is also stable and the smaller proportion of water adapts this composition for use as a silk screen ink.

*Example 3*

The present example illustrates the use of an unsaturated silane in combination with an unsaturated polyester resin, the resin and the silane being reactive by copolymerization.

Composition: Parts
Polyester formed by reaction of maleic acid, phthalic acid, glycerol and non-oxidizing, short oil, castor oil-glyceryl phthalate alkyd containing 10% of maleic acid based on the total weight of dicarboxylic acids present _____ 32.8
Xylene _____ 32.8
Spermaceti wax _____ 1.3
Demineralized water _____ 31.5
Octyl phenol polyoxyethylene condensate _____ 1.3
Vinyl silane
  $((CH_2=CH-Si(OCH_2CH_2-O-CH_3)_3))$ ___ 0.3

The foregoing composition forms adherent films on glass by simply spraying the emulsion upon the glass surface and then baking to cure the coating.

*Example 4*

A further illustration of compositions in accordance with the invention using a vinyl silane is as follows.

Composition: Parts
Polyester copolymer (reaction product of ethylene glycol, maleic anhydride and styrene used in equimolar proportions and catalyzed with benzoyl peroxide _____ 13.1
Xylene _____ 51.7
Spermaceti wax _____ 1.3
Demineralized water _____ 32.5
Octyl phenol polyoxyethylene condensate _____ 1.3
Vinyl silane of Example 3 _____ 0.1

100.0

The foregoing composition forms adherent films on glass by simply spraying the emulsion upon the glass surface and then baking to cure the coating.

*Example 5*

The present example illustrates the use of esters of alkoxy silanes, the ester generating carboxyl reactivity in situ.

| Composition | Parts | | |
|---|---|---|---|
| | A | B | C |
| Copolymer of ethyl acrylate, acrylic acid and acrylonitrile in a weight ratio of 65/5/30 copolymerized in dimethyl formamide at 80° C. in the presence of 1% by weight of benzoyl peroxide | 9.5 | | |
| Diglycidyl ether specified in Example 1 | 1.0 | | |
| Heat-hardenable, solvent-soluble, butylated melamine-formaldehyde condensate | | 11.9 | |
| Solvent-soluble, heat-hardenable alkaline condensate of equimolecular proportions of para-tertiary-butyl phenol and formaldehyde | | | 11.9 |
| Cellosolve acetate | 1.0 | | |
| Xylene | 13.0 | 11.9 | 10.7 |
| n-Butyl alcohol | | | 1.2 |
| Oleic acid | 2.4 | 2.4 | 2.4 |
| Morpholine | 2.2 | 1.7 | 1.7 |
| Demineralized water | 70.4 | 71.6 | 71.6 |
| Ester type silane | 0.5 | 0.5 | 0.5 |
| 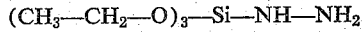 $CH_3CH_2-O-\overset{O}{\underset{\|}{C}}-CH_2-CH_2-CH_2-Si-(O-CH_2-CH_3)_3$ | 100.0 | 100.0 | 100.0 |

The foregoing compositions form adherent films on glass by simply spraying the emulsion upon the glass surfaces and then baking to cure the coating.

*Example 6*

Examples 5B and C are repeated using $(CH_3-CH_2-O)_3-Si-NH-NH_2$ in place of the ester type silane of Example 5. Corresponding results are obtained.

The compositions of the invention may be baked at temperatures of from about 300° F. to the very elevated temperatures produced by flame curing using baking times of from about 30 seconds to 30 minutes. The various compositions of the examples of the present application are adequately cured when applied at from 0.2—1.0 mil thickness on ¼" thick glass and baked using baking temperatures of 400° F. for a period of from 2–15 minutes.

The coating emulsions of the invention have been tested on hard opal glass (a heat resistant borosilicate type glass), Pyrex, plate glass and flint glass and provide good performance, e.g., good initial adhesion and resistance to exposure to high humidity, water immersion, alcohol attack and household cleaning agents. It should also be kept in mind that glass, as it comes from the annealing lehr may have a variety of surfaces. Moreover, glass is not infrequently coated with some lubricant to reduce its tendency to abrade. Further, glass, upon aging, tends to develop a surface alkalinity. The coating emulsions of the invention perform satisfactorily over all these surfaces.

The coating compositions of the invention are particularly adapted for application to the exterior and/or interior of glassware and especially glass bottles of various types to provide coated bottles of a wide range of colors. Of course, it is feasible to color the glass directly, but production of colored glass bottles is only feasible in commerce in a few colors where large quantity production is in order. Additionally, and in the field of providing specially decorated bottles, various decorative effects can be achieved by simultaneously spraying two different colors at different angles or by spraying one color over another either in whole or in part or by the addition to the composition of spangles, threads or other decorative materials.

The inclusion of ultra-violet light absorbers is also a matter of interest, particularly for bottles intended for pharmaceutical use. Additionally, the coatings on the invention are highly useful to provide decorative effects on glass plate and glass block for use in building structures.

The emulsions of the invention may be produced and shipped with a minor proportion of water and these emulsions can then be thinned by adding water at the time of application to provide the viscosity and resin solids content which is desired for any given application.

The invention is defined in the claims which follow.

I claim:

1. An emulsion coating composition adapted to be applied to untreated glass as a single coating to form adherent coatings thereupon comprising, film-forming resin containing at least one reactive functional group dissolved in water-immiscible organic solvent comprising the dispersed liquid phase of said emulsion, and an aqueous continuous phase containing dissolved hydroxy silane, said silane being substituted to provide at least one reactive functional group reactive with said film-forming resin and providing functionality selected from the group consisting of amine functionality, carboxyl functionality and vinyl functionality, said organic solvent being non-reactive with said film-forming resin and said silane, and the reactive functional group of said film-forming resin providing functionality selected from the group consisting of carboxyl functionality, oxirane functionality, hydroxyl functionality and olefinic unsaturation functionality.

2. An emulsion coating composition as recited in claim 1 in which said silane has the following structural formula:

$$X_m\text{---}Si\text{---}(Y)_n$$

in which X is a substituent including a reactive functional group, Y is selected from the group consisting of hydroxy and precursors thereof and $m$ and $n$ are integers totaling 4.

3. An emulsion coating composition as recited in claim 2 in which said silane is a tri-ethoxy silane.

4. An emulsion coating composition as recited in claim 1 in which said silane includes amine functionality.

5. An emulsion coating composition as recited in claim 1 in which said silane includes carboxyl functionality.

6. An emulsion coating composition as recited in claim 1 in which said silane includes vinyl functionality.

7. An emulsion coating composition as recited in claim 1 in which said water-immiscible organic solvent comprises a major weight proportion of aromatic hydrocarbon solvent.

8. An emulsion coating composition as recited in claim 1 in which the dispersed liquid phase of said emulsion includes a long chain organic acid and said aqueous phase includes a volatile nitrogenous base.

9. An emulsion coating composition as recited in claim 8 in which said volatile nitrogenous base is ammonia.

10. An emulsion coating composition adapted to be applied to untreated glass as a single coating to form adherent coatings thereupon comprising, film-forming resin including oxirane functionality dissolved in water-immiscible organic solvent containing a major weight proportion of aromatic hydrocarbon solvent comprising the dispersed liquid phase of said emulsion, and an aqueous continuous phase containing dissolved hydroxy silane, said silane being substituted to provide amine functionality, and said organic solvent being non-reactive with said film-forming resin and said silane.

11. An emulsion coating composition adapted to be applied to untreated glass as a single coating to form adherent coatings thereupon comprising, film-forming resin including ethylenic unsaturation dissolved in water-immiscible organic solvent containing a major weight proportion of aromatic hydrocarbon solvent comprising the dispersed liquid phase of said emulsion, and an aqueous continuous phase containing dissolved hydroxy silane, said silane being substituted to provide vinyl functionality, and said organic solvent being non-reactive with said film-forming resin and said silane.

12. An emulsion coating composition as recited in claim 11 in which said film-forming resin is an ethylenically unsaturated polyester resin.

13. An emulsion coating composition adapted to be applied to untreated glass as a single coating to form adherent coatings thereupon comprising, film-forming resin including methylol functionality dissolved in water-immiscible organic solvent containing a major weight proportion of aromatic hydrocarbon solvent comprising the dispersed liquid phase of said emulsion, and an aqueous continuous phase containing dissolved hydroxy silane, said silane being substituted to provide carboxyl functionality, and said organic solvent being non-reactive with said film-forming resin and said silane.

14. An emulsion cooling composition adapted to be applied to untreated glass as a single coating to form adherent coatings thereupon comprising, film-forming resin including methylol functionality dissolved in water-immiscible organic solvent containing a major weight proportion of aromatic hydrocarbon solvent comprising the dispersed liquid phase of said emulsion, and an aqueous continuous phase containing dissolved hydroxy silane, said silane being substituted to provide amine functionality, and said organic solvent being non-reactive with said film-forming resin and said silane.

15. An emulsion coating composition adapted to be applied to untreated glass as a single coating to form adherent coatings thereupon comprising, film-forming resin including oxirane functionality dissolved in water-immiscible organic solvent comprising a major weight proportion of mononuclear aromatic hydrocarbon solvent comprising the dispersed liquid phase of said emulsion, and an aqueous continuous phase containing water and dissolved amino-substituted tri-alkoxy silane, said dispersed liquid phase containing long chain fatty acid and said continuous phase containing volatile nitrogenous base to maintain said emulsion, said continuous phase containing volatile organic acid to stabilize said amino substituent to provide increased storage stability for said emulsion, and said organic solvent being non-reactive with said film-forming resin and said silane.

References Cited by the Examiner

UNITED STATES PATENTS

| 2,688,007 | 8/54 | Steinman | 260—46.5 |
| 2,799,598 | 7/57 | Biefeld et al. | 260—29.2 |
| 2,951,772 | 9/60 | Marzocchi et al. | 260—29.6 |

FOREIGN PATENTS

| 798,808 | 7/58 | Great Britain. |
| 543,092 | 7/57 | Canada. |

LEON J. BERCOVITZ, *Primary Examiner.*

JAMES A. SEIDLECK, *Examiner.*